United States Patent
Katayama et al.

(10) Patent No.: US 8,008,429 B2
(45) Date of Patent: Aug. 30, 2011

(54) THERMOSETTING RESIN COMPOSITION

(75) Inventors: Atsuhiko Katayama, Kitakyushu (JP); Niranjan Kumar Shrestha, Kitakyushu (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 293 days.

(21) Appl. No.: 11/991,851

(22) PCT Filed: Aug. 23, 2006

(86) PCT No.: PCT/JP2006/316485
§ 371 (c)(1),
(2), (4) Date: Mar. 31, 2009

(87) PCT Pub. No.: WO2007/032185
PCT Pub. Date: Mar. 22, 2007

(65) Prior Publication Data
US 2010/0130697 A1    May 27, 2010

(30) Foreign Application Priority Data
Sep. 13, 2005 (JP) ................. 2005-265821

(51) Int. Cl.
*C08G 65/04* (2006.01)

(52) U.S. Cl. ........ 528/410; 423/606; 525/410; 528/408; 528/409; 528/417; 549/510

(58) Field of Classification Search ............. 528/417, 528/408, 409, 410; 423/606; 525/410; 549/510
See application file for complete search history.

(56) References Cited

U.S. PATENT DOCUMENTS
5,463,084 A    10/1995    Crivello et al.

FOREIGN PATENT DOCUMENTS
| | | | |
|---|---|---|---|
| JP | 58-057429 | * | 4/1983 |
| JP | 3074086 | | 1/1994 |
| JP | 09-208674 | | 8/1997 |
| JP | 09-221625 | | 8/1997 |
| JP | 09-291144 | | 11/1997 |
| JP | 2001-163969 | | 6/2001 |
| JP | 2002-249578 | | 9/2002 |
| JP | 2003-012794 | * | 1/2003 |
| JP | 2005-171119 | * | 6/2005 |

OTHER PUBLICATIONS
International Search Report mailed Oct. 10, 2006, issued on PCT/JP2006/316485.
International Preliminary Report on Patentability issued on PCT/JP2006/316485, May 22, 2008.

* cited by examiner

*Primary Examiner* — David Wu
*Assistant Examiner* — Robert Jones
(74) *Attorney, Agent, or Firm* — Edwards Angell Palmer & Dodge LLP

(57) ABSTRACT

Disclosed is a thermosetting resin composition of excellent low-temperature curability comprising an oxetane compound and also disclosed is a cured article obtained therefrom. The thermosetting resin composition comprises an oxetane compound (A) containing two or more oxetane functional groups in the molecule represented by the following general formula (1) and a heteropolyacid (B) as essential components. A cured article obtained by heat curing of this composition shows excellent mechanical properties, electrical properties, adhesive properties, resistance to heat, moisture, and chemicals, and the like. In formula (1), $R_1$ is a hydrogen atom, alkyl group of 1 to 6 carbon atoms, fluorine atom, fluoroalkyl group of 1 to 6 carbon atoms, allyl group, aryl group, aralkyl group, furyl group, or thienyl group.

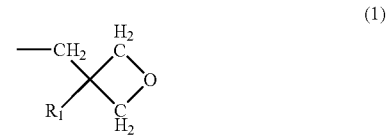

(1)

8 Claims, 2 Drawing Sheets

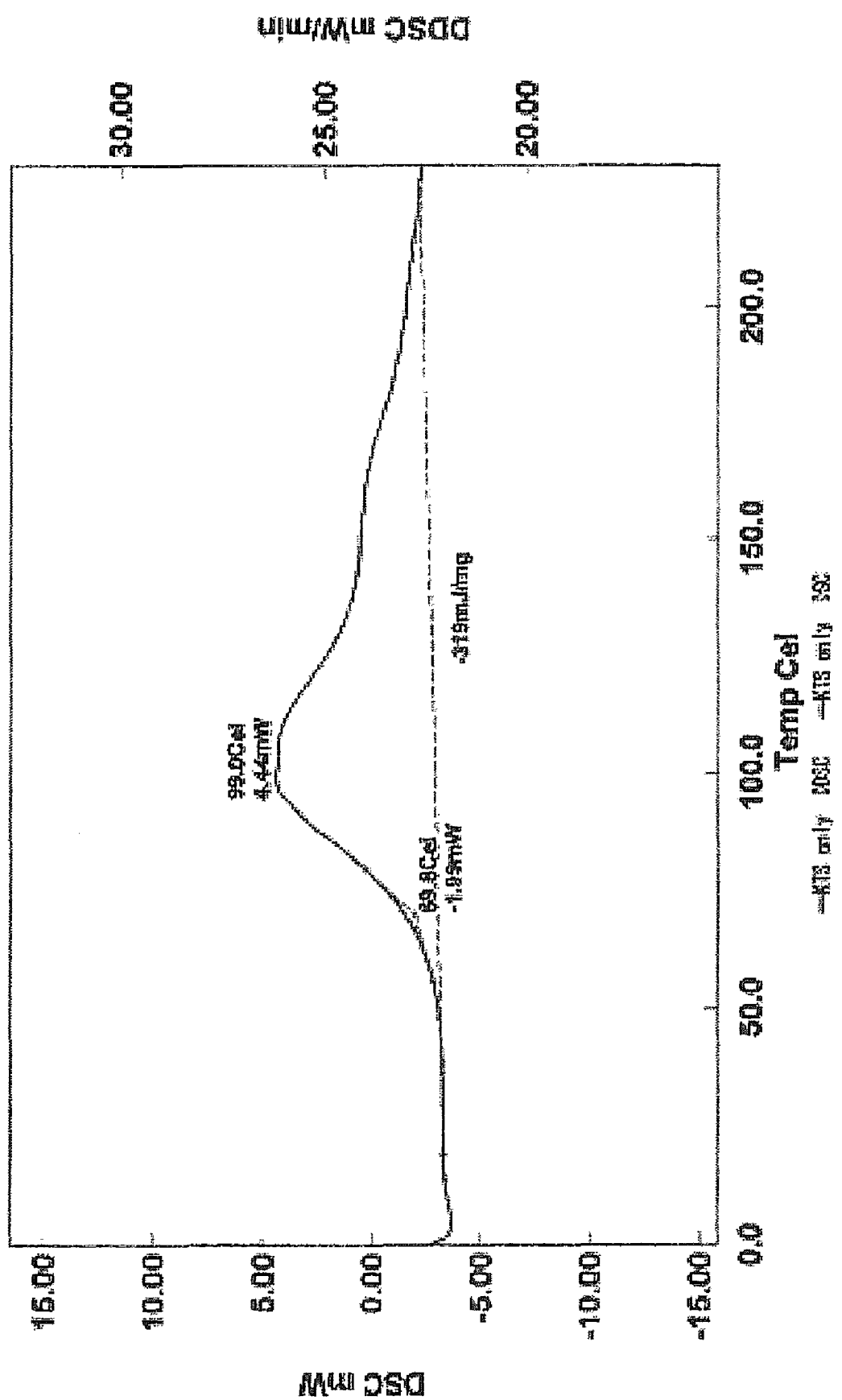

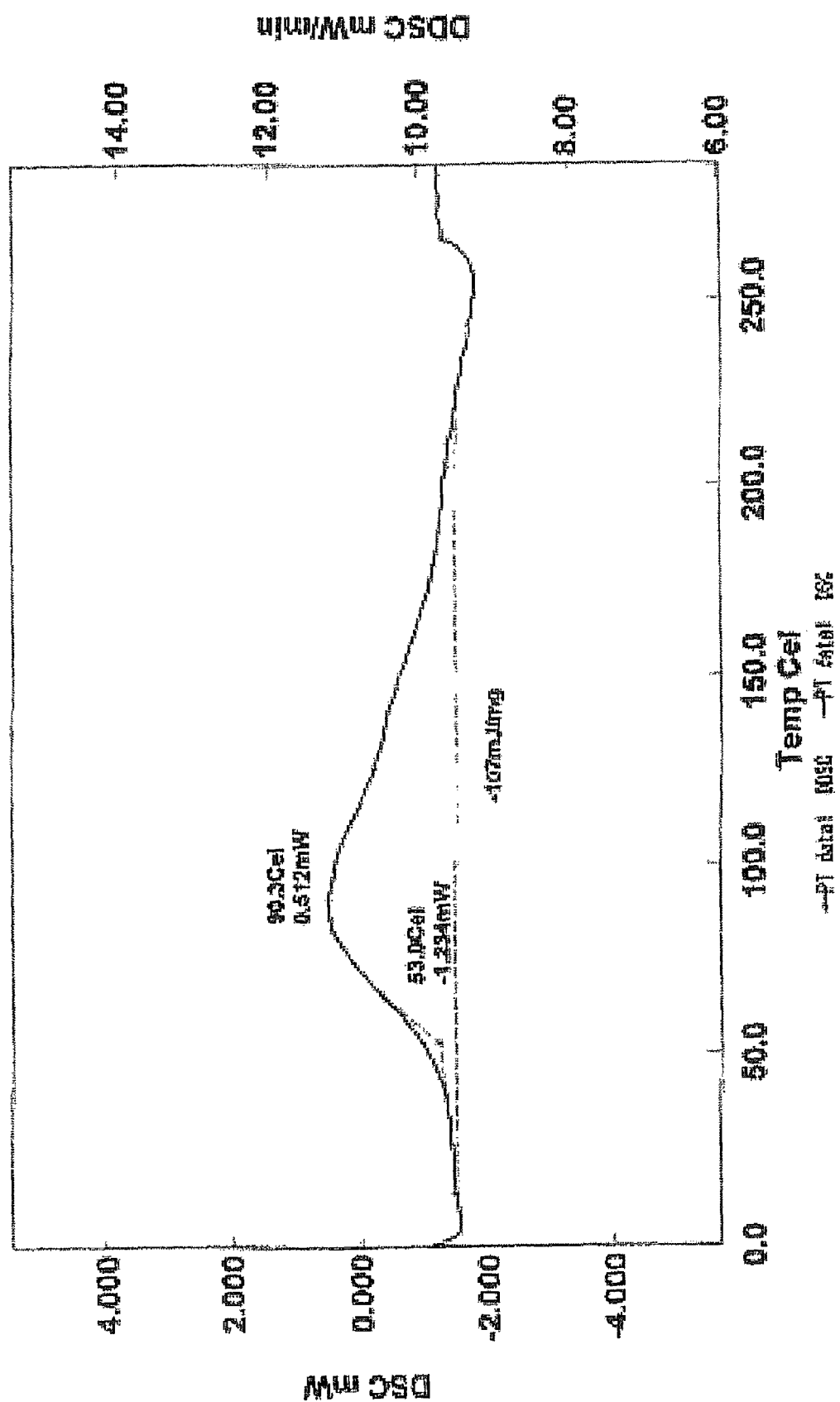

THERMOSETTING RESIN COMPOSITION

FIELD OF TECHNOLOGY

This invention relates to an oxetane resin composition which shows excellent low-temperature curability.

BACKGROUND TECHNOLOGY

The prior-art documents relating to this invention are listed below.
Patent document 1: JP3074086 B (US5463084 A)
Patent document 2: JP2002-249578 A
Patent document 3: JP9-208674 A
Patent document 4: JP9-221625 A
Non-patent document 1: Journal of the Japanese Chemical Society, 1 (1993)
Non-patent document 2: Kogyo Zairyo, 49, (6), 53 (2001)
Non-patent document 3: Porisan no Kagaku, Kikan Kagaku Sosetsu No. 20, 1993, edited by the Japanese Chemical Society Oxetane compounds have recently attracted attention as monomers capable of undergoing photoinitiated cationic polymerization or curing. For example, the patent document 1 describes a variety of oxetane derivatives and photocurable compositions. However, these compositions are not suitable for heat curing.

The non-patent document 2 describes the effectiveness of a quaternary onium salt such as tetraphenylphosphonium bromide for heat curing of oxetane compounds, However, the quaternary onium salt in question requires a temperature of 130° C. and a period of as long as 30 hours for the reaction and this is not practical. The patent document 2 describes a thermosetting composition involving the use of a metal salt such as a zinc carboxylate, but this composition is not satisfactory as it requires the conditions of 130° C. and 5 hours for the reaction.

The patent document 4 describes that a resin composition containing a sulfonium salt as a catalyst exhibits excellent low-temperature curability. However, the document further describes that it is essential for this resin composition to comprise a compound having both an oxetane functional group and a highly reactive epoxy group in the same molecule and gives no example of compounds having only an oxetane functional group. Moreover, the sulfonium salt, although highly reactive, contains antimony of high toxicity as a counter anion and is not desirable for practical use.

As described in the non-patent document 1, an organosilane and an aluminum chelate are used as a catalyst in the cationic polymerization of epoxy resins and the cured article is characterized by excellent electrical insulating properties as it is free from ionic impurities. The patent document 3 describes a curable oxetane composition comprising similarly an organosilane and an aluminum chelate as a catalyst. However, the incorporation of a highly reactive polyepoxide constitutes an essential condition and the document gives no example of the curing of an oxetane compound alone.

DISCLOSURE OF THE INVENTION

Problems to be Solved by the Invention

An object of this invention is to provide an oxetane resin composition which shows excellent low-temperature curability.

Means to Solve the Problems

A heteropolyacid has been known as an oxidation reaction catalyst and an acid catalyst and is used as a catalyst in the epoxidation of olefins by hydrogen peroxide, ring-opening polymerization reaction of tetrahydrofuran, hydration reaction, Friedel-Crafts reaction, and the like. However, no instance is known wherein a heteropolyacid is used as a curing catalyst for oxetane resins. Taking notice of high acidity of heteropolyacids, the inventors of this invention have conducted intensive studies and found that a resin composition comprising an oxetane compound (A) and a heteropolyacid (B) shows excellent low-temperature curability.

Accordingly, this invention relates to a thermosetting resin composition comprising as essential components an oxetane compound (A) having an oxetane functional group represented by the following general formula (1)

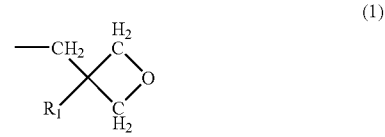

(1)

wherein $R_1$ is a hydrogen atom, alkyl group of 1 to 6 carbon atoms, fluorine atom, fluoroalkyl group of 1 to 6 carbon atoms, allyl group, aryl group, aralkyl group, furyl group, or thienyl group and a heteropolyacid (B). Further, this invention relates to a method of curing said thermosetting resin composition and to a cured article obtained therefrom.

The oxetane compound (A) comprises 2 or more oxetane functional groups represented by general formula (1). In general formula (1), $R_1$ is a hydrogen atom, alkyl group of 1 to 6 carbon atoms, fluorine atom, fluoroalkyl group of 1 to 6 carbon atoms, allyl group, aryl group, aralkyl group, furyl group, or thienyl group. The alkyl group of 1 to 6 carbon atoms may be linear or branched and examples include methyl, ethyl, n-propyl, isopropyl, n-butyl, isobutyl, sec-butyl, tert-butyl, and n-hexyl. The fluoroalkyl group of 1 to 6 carbon atoms is derived from the foregoing alkyl group by replacing at least one of the hydrogen atoms with a fluorine atom and examples include fluoropropyl, fluorobutyl, and trifluoropropyl. Examples of the aryl group include phenyl, toluyl, and xylyl. The aralkyl groups include benzyl and phenetyl. Preferable groups for $R_1$ are lower alkyl groups of 1 to 4 carbon atoms such as methyl and ethyl.

Polyfunctional oxetane compounds containing two or more oxetanyl groups in the molecule can be used as an oxetane compound and they are not limited to any specific compound.

Bisoxetanes represented by the following general formula (2) may be cited as a bifunctional oxetane compound.

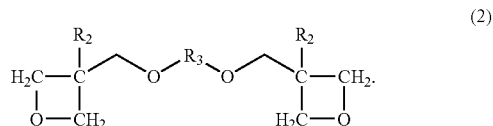

(2)

In the aforementioned general formula (2), $R_2$ means the same as $R_1$ in general formula (1). Preferably, $R_2$ is a hydrogen atom or an alkyl group of 1 to 6 carbon atoms. The alkyl group may be linear or branched and examples include methyl, ethyl, n-propyl, isopropyl, n-butyl, sec-butyl, t-butyl, n-pentyl, isopentyl, neopentyl, n-hexyl, and isohexyl. Preferred are methyl and ethyl groups.

The group $R_3$ is a divalent group and preferable examples include divalent groups derived from linear or branched saturated hydrocarbons of 1 to 12 carbon atoms, divalent groups derived from linear or branched unsaturated hydrocarbons of 1 to 12 carbon atoms, aromatic hydrocarbon groups represented by the following formulas (a), (b), (c), (d), and (e), alicyclic hydrocarbon groups represented by formulas (f), (g), (h), (i), and (j), linear or cyclic alkylenes containing carbonyl groups represented by formulas (k) and (l), and aromatic divalent groups containing carbonyl groups represented by formulas (m) and (n). Other bifunctional oxetane compounds include compounds of cardo type or naphthalene type.

(a)

(b)

(c)

(d)

(e)

(f)

(g)

(h)

(i)

(j)

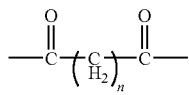
(k)

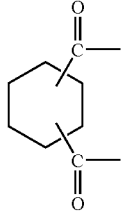
(l)

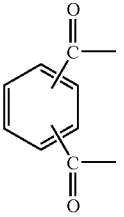
(m)

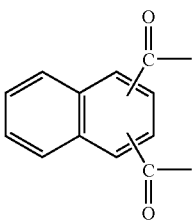
(n)

In formulas (a) to (n), $R_4$ is a hydrogen atom, alkyl group of 1 to 12 carbon atoms, aryl group, or aralkyl group, $R_5$ is —O—, —S—, —CH$_2$—, —NH—, —SO$_2$—, —CH(CH$_3$)—, —C(CH$_3$)$_2$—, or —C(CF$_3$)$_2$—, $R_6$ is a hydrogen atom or an alkyl group of 1 to 6 carbon atoms, and n is an integer of 1 to 12.

Of the oxetane compounds having two oxetane rings in the molecule, preferable are the compounds represented by general formula (2) wherein $R_2$ is a methyl or ethyl group and $R_3$ is a linear alkylene group of 1 to 12 carbon atoms, the divalent group represented by formula (d), or the divalent group represented by formula (a) wherein $R_4$ is hydrogen. Another preferable example of $R_3$ here is the divalent group represented by formula (h) or (j). Concrete examples of bifunctional oxetanes are listed below.

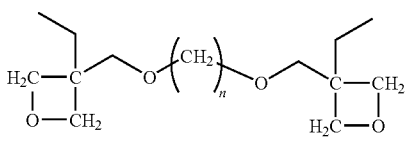
n = 2, 4, 6, 8

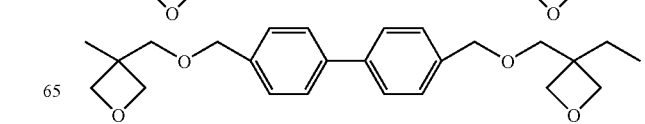

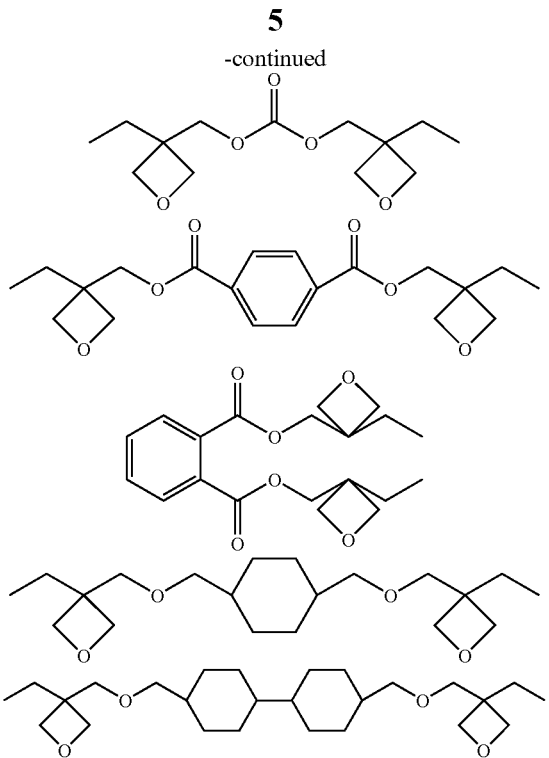

An example of polyfunctional oxetane compounds, trifunctional or higher, is represented by the following general formula (3).

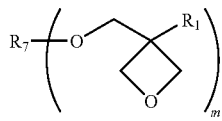 (3)

In the aforementioned general formula (3), $R_1$ is as defined in general formula (1) and $R_7$ is the residual group of a compound or resin containing three or more hydroxyl groups. Examples of $R_7$ include trivalent branched alkylene groups of 1 to 12 carbon atoms represented by the following formulas (o), (p), and (q), trivalent aromatic hydrocarbon groups represented by formulas (r), (s), and (t), and the residual groups of resins containing three or more hydroxyl groups such as novolak resins, poly(hydroxystyrene) resins, calixarene resins, and silicone resins like silsesquioxanes. The symbol m is the number of the oxetane functional groups bonded by ether linkage to $R_7$ and it is an integer of 3 or more, preferably an integer of 3 to 5000.

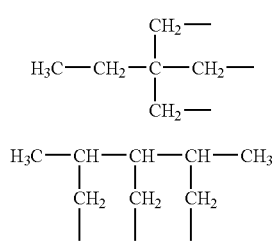

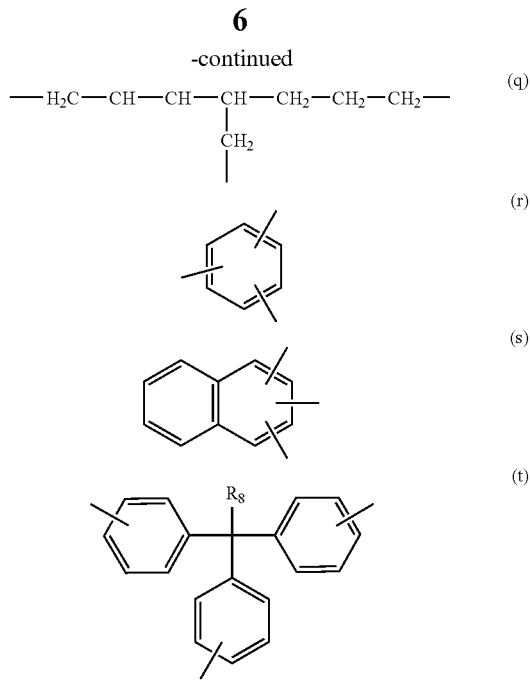

In formula (t), $R_8$ is a hydrogen atom, an alkyl group of 1 to 6 carbon atoms, or an aryl group.

Another example of polyfunctional oxetane compounds is copolymers of an oxetane-containing unsaturated monomer and an alkyl (meth)acrylate.

The heteropolyacid (B) to be used in this invention is a compound that forms in the following manner. Molybdenum (VI) ions and tungsten(VI) ions become oxo acids in water and these oxo acids polymerize to yield polyoxo acids. In the course of this polymerization not only oxo acids of the same kind polymerize but also oxo acids of a different kind polymerize around certain oxo acids to form heteropolyacids. The element forming the oxo acids in the center is called a hetero element while the element forming the oxo acids that polymerize around the oxo acids in the center is called a poly element. The hetero elements include Si, P, As, S, Fe, and Co and the poly elements include Mo, W, and V. A variety of poly elements can access the hetero elements during polymerization and various combinations of poly and hetero elements can produce a variety of heteropolyacids. Any of the heteropolyacids of this kind can be used freely in this invention.

Phosphotungstic acid, phosphomolybdic acid, silicotungstic acid, silicomolybdic acid, and a mixture thereof are preferable because of their good curability and ready availability and silicotungstic acid and silicomolybdic acid are more preferable.

The amount of the heteropolyacid (B) to be incorporated in 100 parts by weight of the oxetane compound (A) is in the range of 0.01 to 5 parts by weight, preferably in the range of 0.01 to 2 parts by weight. Incorporation of less than 0.01 part by weight of the heteropolyacid lowers curability and processability while incorporation of more than 5 parts by weight lowers storage stability.

The heteropolyacid may be used as it is or, in case it shows poor compatibility with other components, it is dissolved in a solvent and used as a solution. Any solvent that is inert to heteropolyacids and capable of dissolving them can be used freely; its examples are polar solvents such as water, methanol, ethanol, THF, DMF, and DMAc and nonpolar solvents such as toluene and xylene. Moreover, a high-boiling polar solvent that does not volatilize and hardly causes the formation of bubbles during heat curing can be used advantageously; examples of such solvents are propylene carbonate, ethylene carbonate, γ-butyrolactone, diethylene glycol dimethyl ether, and methyl carbitol.

The thermosetting resin composition of this invention can be made into a cured article by heating the said composition to effect heat curing. This heat curing is preferably performed by keeping the composition dissolved in a solvent or in the molten state without a solvent. Therefore, the temperature for heat curing is preferably in the range of 50 to 300° C. when performed in the dissolved state or it is above the melting point of the oxetane compound and below 300° C. when performed in the molten state.

The pressure for heat curing is not restricted and it may be below, at, or above the atmospheric pressure. The time for heat curing is in the range of 0.1 to 10 hours, preferably in the range of 0.5 to 3 hours, although it varies with the kind of compound in the composition and heat curing conditions. The heat curing is preferably performed in an atmosphere of inert gas such as nitrogen, argon, and helium.

The aforementioned solvent is preferably the one that swells the oxetane compounds and shows no reactivity with them. The amount of the solvent is just as much as to dissolve or swell the oxetane compounds. For example, when a polar solvent such as DMF, DMAC, HMPA, DMSO, and NMP to be described below is used, its amount is 1 to 10 times that of the oxetane compound on a volume basis.

The solvents of the aforementioned kind include amides such as N,N-dimethylformamide (DMF), N,N-dimethylacetamide (DMAC), and hexamethyl phosphoric triamide (HMPA), ethers such as diethylene glycol dimethyl ether, diethylene glycol diethyl ether, triethylene glycol dimethyl ether, anisole, and phenetole, halogenated aromatic hydrocarbons such as o-dichlorobenzene and 3,4-dichlorotoluene, nitrobenzene, dimethyl sulfoxide (DMSO), sulfolane, tetramethylurea, and N-methyl-2-pyrrolidone (NMP). Of these solvents, preferred are DMF, DMAC, HMPA, DMSO, and NMP.

As mentioned above, the thermosetting resin composition of this invention is cured by heat, cooled to room temperature in the usual manner by air or water, and the cured article is taken out of the reactor. If necessary, the cured article is further dried below 100° C. for a period of 2 to 10 hours by a known technique such as hot-air drying, vacuum drying, and freeze drying. An insolue and infusible cured article of three-dimensional structure is obtained in this manner. In the case where the thermosetting resin composition is cured by heat in a solvent, the cured article is obtained by evaporating the solvent before cooling the reaction product or the cured article is obtained as a flexible article still containing the solvent by cooling the reaction product.

Further, the thermosetting resin composition of this invention may be applied to a base material such as metal, rubber, plastics, molded parts, film, paper, wood, glass cloth, concrete, and ceramic and heated at a prescribed temperature for a prescribed period of time to yield a cured article; that is, a base material coated with a film of the cured article can be obtained.

Still further, the thermosetting resin composition of this invention can be mixed before use with the following known additives to the extent that such mixing does not damage the effects of this invention; inorganic fillers, reinforcing materials, colorants, stabilizers (such as heat stabilizers and weatherability improvers), extenders, viscosity modifiers, fire retardants, UV absorbers, antioxidants, discoloration inhibitors, antibacterial agents, antimildew agents, antiaging agents, antistatic agents, plasticizers, lubricants, foaming agents, and mold release agents.

It is also possible to add a monofunctional oxetane compound as a reactive diluent. Examples of such monofunctional oxetanes include 3-hydroxymethyloxetane, 3-methyl-3-hydroxymethyloxetane, and 3-ethyl-3-hydroxymethyloxetane.

PREFERRED EMBODIMENTS OF THE INVENTION

This invention will be described in more detail below with reference to the accompanying examples. The term "part" means part by weight. The materials used in the examples and comparative examples and symbols therefor are described below and these materials were used as received without purification.

Component (A)
  OXBP: 4,4'-bis[(3-ethyl-3-oxetanyl)methoxymethyl]biphenyl, manufactured by Ube Industries, Ltd.
Component (B)
  SiW: Silicotungstic acid, manufactured by Nippon Inorganic Colour & Chemical Co., Ltd.
  PW: Phosphotungstic acid, manufactured by Nippon Inorganic Colour & Chemical Co., Ltd.
  SiMo: Silicomolybdic acid, manufactured by Nippon Inorganic Colour & Chemical Co., Ltd.
Component (C1): Al—Si/based polymerization catalyst
  AltPO: Aluminum triisopropoxide (manufactured by Kawaken Fine Chemicals Co., Ltd.)
  TPSi: Triphenylsilanol (reagent, manufactured by Tokyo Chemical Industry Co., Ltd.)
Component (C2): cationic polymerization initiator
  SI110L: $PF_6^-$-based sulfonium salt (San-aid SI110L, manufactured by Sanshin Chemical Industry Co., Ltd.)
  SI100L: $SbF_6^-$-based sulfonium salt (San-aid SI100L, manufactured by Sanshin Chemical Industry Co., Ltd.)
  TPPBr: tetraphenylphosphine bromide
  (Solvent):
  PrC: Propylene carbonate

Example 1

A solution of 0.02 part by weight of SiW in 0.38 part by weight of PrC was added to 100 parts by weight of OXBP and the mixture was stirred at room temperature to prepare a thermosetting resin composition. The gel time was used to evaluate the reactivity of the thermosetting resin composition in heat curing. The gel time of the composition was measured at 100° C. with the aid of a gelation tester, Model GT-D, manufactured by Nisshin Kagaku Co., Ltd.

Example 2

A solution of 0.02 part by weight of PW in 0.38 part by weight of PrC was added to 100 parts by weight of OXBP and the mixture was stirred at room temperature to prepare a thermosetting resin composition. The gel time of the composition was measured at 100° C.

Example 3

A solution of 0.02 part by weight of SiMo in 0.38 part by weight of PrC was added to 100 parts by weight of OXBP and the mixture was stirred at room temperature to prepare a thermosetting resin composition. The gel time of the composition was measured at 150° C.

Example 4

The thermosetting resin composition prepared by adding a solution of 0.02 part by weight of SiW in 0.38 part by weight of PrC to 100 parts by weight of OXBP was poured into a mold and cured at 150° C. for 60 minutes to give a cured resin. Specimens for the tensile test conforming to JIS K6911 were prepared from the cured resin. The test results were as follows: glass transition temperature (TMA method), 114° C.; tensile strength, 38 Mpa; tensile elongation at break, 10.9%; tensile modulus, 657 Mpa.

Comparative Examples 1-4

Thermosetting resin compositions were respectively prepared by mixing the components described in Table 1 at room temperature. The polymerization catalysts described in the aforementioned prior-art documents were used; that is, the organosilane and the aluminum chelate in Comparative Example 1, the sulfonium salts in Comparative Examples 2 and 3, and the quaternary onium salt in Comparative Example 4. The compositions were tested for their gel time at 100° C.

The results are shown in Table 1. The expression >300 means that gelation did not occur in 300 seconds.

TABLE 1

|    |         | Example |      |      | Comparative example |      |      |      |
|----|---------|---------|------|------|------|------|------|------|
|    |         | 1       | 2    | 3    | 1    | 2    | 3    | 4    |
| A  | OXBP    | 100     | 100  | 100  | 100  | 100  | 100  | 100  |
| B  | SiW     | 0.02    |      |      |      |      |      |      |
|    | PW      |         | 0.02 |      |      |      |      |      |
|    | SiMo    |         |      | 0.02 |      |      |      |      |
| C1 | AltPO   |         |      |      | 0.02 |      |      |      |
|    | TPSi    |         |      |      | 0.02 |      |      |      |
| C2 | SI100L  |         |      |      |      | 0.02 |      |      |
|    | SI110L  |         |      |      |      |      | 0.02 |      |
|    | TPPBr   |         |      |      |      |      |      | 0.02 |
|    | PrC     | 0.38    | 0.38 | 0.38 |      |      |      |      |
| Gel time (sec) |  | 9 | 16.3 | 42 | >300 | >300 | >300 | >300 |

It is apparent from Table 1 that the thermosetting resin compositions of this invention show marked improvement in low-temperature curability.

INDUSTRIAL APPLICABILITY

The thermosetting resin composition of this invention shows a high rate of heat curing. The composition cures by intermolecular crosslinking to give an insoluble and infusible article of three-dimensional structure which shows excellent mechanical properties (tensile strength, hardness, and the like), electrical properties (insulating properties and the like), adhesive properties, resistance to heat, moisture, and chemicals, and the like. The composition is promising as a substitute for epoxy resins in the fields of paints, coatings, adhesives, electrical insulating materials, encapsulating materials, and laminates and in repairing concrete structures and bonding reinforcing steel plates.

What is claimed is:

1. A thermosetting resin composition comprising an oxetane compound (A) containing two or more oxetane groups represented by the following general formula (1) in the molecule and a heteropolyacid (B) incorporated at a rate of 0.01 to 5 parts by weight to 100 parts by weight of an oxetane compound;

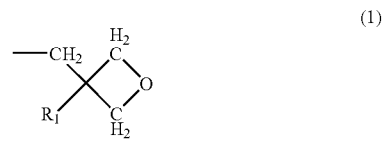

(1)

in formula (1), $R_1$ is a hydrogen atom, alkyl group of 1 to 6 carbon atoms, fluorine atom, fluoroalkyl group of 1 to 6 carbon atoms, allyl group, aryl group, aralkyl group, furyl group, or thienyl group.

2. A thermosetting resin composition as described in claim 1 wherein the heteropolyacid is phosphotungstic acid, phosphomolybdic acid, silicotungstic acid, or silicomolybdic acid, or a mixture thereof.

3. A process for producing a cured resin which comprises heating the thermosetting resin composition described in claim 1 in the state of solution or in the molten state at a temperature in the range of 50 to 300° C. to effect heat curing.

4. A cured resin obtained by heat curing of the thermosetting resin composition described in claim 1.

5. A thermosetting resin composition as described in claim 1 wherein the thermosetting resin existing in the thermosetting resin composition consists of only an oxetane compound containing an oxetane functional group.

6. A process for producing a cured resin which comprises heating the thermosetting resin composition described in claim 2 in the state of solution or in the molten state at a temperature in the range of 50 to 300° C. to effect heat curing.

7. A cured resin obtained by heat curing of the thermosetting resin composition described in claim 2.

8. A thermosetting resin composition as described in claim 2 wherein the thermosetting resin existing in the thermosetting resin composition consists of only an oxetane compound containing an oxetane functional group.

* * * * *